United States Patent [19]

Huffman

[11] 4,232,949

[45] Nov. 11, 1980

[54] LIQUID CRYSTAL COMPOSITIONS CONTAINING PLEOCHROIC DYE

[75] Inventor: William A. Huffman, Minneapolis, Minn.

[73] Assignee: Minnesota Mining and Manufacturing Company, Saint Paul, Minn.

[21] Appl. No.: 14,540

[22] Filed: Feb. 23, 1979

[51] Int. Cl.³ ............................ C09K 3/34; G02F 1/13
[52] U.S. Cl. .................................. 350/349; 252/299; 252/408; 350/350 R
[58] Field of Search ............... 252/299, 408; 350/346, 350/349, 350 R

[56] References Cited

U.S. PATENT DOCUMENTS

| | | | |
|---|---|---|---|
| 3,833,287 | 9/1974 | Taylor et al. | 252/408 |
| 3,960,750 | 6/1976 | Moriyama et al. | 252/299 |
| 3,960,751 | 6/1976 | Moriyama et al. | 252/299 |
| 4,105,299 | 8/1978 | Huffman et al. | 252/299 |
| 4,128,497 | 12/1978 | Cole, Jr. et al. | 252/299 |
| 4,130,502 | 12/1978 | Eidenschink et al. | 252/299 |
| 4,137,193 | 1/1979 | Osman et al. | 252/299 |
| 4,143,947 | 3/1979 | Aftercut et al. | 252/299 |
| 4,145,114 | 3/1979 | Coates et al. | 252/299 |
| 4,153,343 | 5/1979 | Bloom et al. | 252/299 |
| 4,154,697 | 5/1979 | Eidenschink et al. | 252/299 |

FOREIGN PATENT DOCUMENTS

| | | | |
|---|---|---|---|
| 2104 | 5/1979 | European Patt. Off. | 252/299 |
| 2815335 | 10/1978 | Fed. Rep. of Germany | 252/299 |

OTHER PUBLICATIONS

Constant, J., et al.; "Photostable Anthraquinone Pleochroic Dyes," presented at 7th Intern'l Liquid Crystal Conf., Bordeaux, France (7/1978).
Bloom, A., et al., Mol. Cryst. Liq. Cryst., vol. 41(Letters), pp. 1-4 (1977).
Bloom, A., et al., Mol. Cryst. Liq. Cryst., vol. 40, pp. 213-221 (1977).
White, D. L., et al.; J. Appl. Phys., vol 45, No. 11 pp. 4718-4723 (1974).

*Primary Examiner*—Teddy S. Gron
*Attorney, Agent, or Firm*—Cruzan Alexander; Donald M. Sell; Warren R. Bovee

[57] ABSTRACT

Liquid crystal compositions containing pleochroic dyes. The pleochroic dyes are substituted anthraquinone dyes containing at least one carbocyclic or heterocyclic group linked to the anthraquinone moiety through a sulfur atom. The dyes are used in guest-host combinations with nematic liquid crystal compositions having positive dielectric anisotropy. Electro-optic devices containing these guest-host combinations are disclosed.

14 Claims, No Drawings

LIQUID CRYSTAL COMPOSITIONS CONTAINING PLEOCHROIC DYE

This invention relates to guest-host combinations of pleochroic dyes in combination with nematic liquid crystal compositions having a net positive dielectric anisotropy. The invention further relates to electro-optical devices employing these guest-host combinations.

One aspect of this invention relates to guest-host combinations of pleochroic, substituted anthraquinones and nematic liquid crystal compositions having positive dielectric anisotropy. Yet another aspect of the invention relates to electro-optical devices employing such guest-host combinations.

Electro-optical devices in which liquid crystals are employed usually comprise two spaced, transparent, flat plates having very thin transparent electrodes on their inwardly facing surfaces and sealed at their periphery to form a closed cell. The space between the plates is filled with a liquid crystalline composition which may be aligned by well known orienting techniques. Impressing an electrical field on the liquid crystal affects the optical properties of the layer of liquid crystal.

It was discovered by Heilmeier and Zanoni, *Applied Physics Letters*, Vol. 13, pages 91–92 (1968), that when pleochroic dyes are combined with nematic liquid crystals in a display device, such as described above, the pleochroic character of the dye is manifested when an electric field is applied and released. That is, the display device may appear to change color or go from clear to colored as the electric field is applied and released and the orientation of the pleochroic dye is altered. The nematic liquid crystal material is commonly referred to as the "host" and the pleochroic dye as the "guest" so that the combination is referred to as a guest-host combination. It is believed that the molecules of the pleochroic material dissolved in the host mixture are ordered by the liquid crystal material thereby forming a cooperatively aligned guest-host system. When the liquid crystal host is oriented or reoriented by the intermittent application of an electric field, the orientation of the pleochroic dye guest is also changed by the movement of the host molecules. The phenomenon has been described in a number of U.S. patents. See, for example U.S. Pat. Nos. 3,551,026; 3,597,044; 3,960,751; 3,551,026 and 3,597,044.

Many pleochroic dyes which are useful in guest-host combinations tend to be elongated molecules exhibiting little or no absorption of light vibrating parallel to the long axis while absorbing that light in various portions of the visible spectrum which vibrates parallel to the short axis. Other pleochroic dyes may align oppositely being colorless (non-absorbing) with respect to light vibrating along the short axis of the molecule and colored (absorbing) with respect to light vibrating parallel to the long axis.

By combining two pleochroic dyes, one each of the above two types, devices which change from one color to another are possible. A further effect is obtained by incorporating an isotropic, i.e., non-pleochroic, dyestuff with a pleochroic dyestuff so that the colors of the two are additive at one stage and the isotropic dyestuff appears at the other stage of cycling the electric field.

In order that there be a cycle between colorless and colored or between two colors for a given device it is desirable to employ the dye in amounts which are soluble in the nematic liquid crystal and not in excess of the proportions which are within the capabilities of alignment by the amount of liquid crystal present. Generally, the pleochroic dyes can be effective in various liquid crystal compositions in amounts up to about 25% by weight, based on the total weight of the guest-host combination. In some cases the solubility of the pleochroic dye in the liquid crystal is inadequate to achieve concentrations above about 5% by weight. Many guest-host combinations of the prior art are capable of achieving contrasts from zero to maximum electric field of about 2:1 up to about 4:1.

It has been generally taught in the prior art that for a dye to be useful in liquid crystal displays it must exhibit favorable parameters with respect to pleochroism, order parameter and solubility in the liquid crystal composition. The structural properties of pleochroic dye molecules exhibiting such favorable parameters have tended to resemble those of the host liquid crystal molecules. Thus, long, rod-shaped easily polarizable molecules, bulky ballasting groups and linearity of the dye molecule have been assumed to be important criteria. Examples of such dyes are found in the patent literature such as in U.S. Pat. Nos. 3,703,329; 3,833,287; 3,960,751 and 4,032,219. Other publications describing such dyes are: Constant, J. et al, "Pleochroic dyes of high optical order parameter" presented at the 6th International Liquid Crystal Conference, Kent Ohio (Aug. 1976), and White, D.C. et al. *J. Applied Physics*, Volume 45, No. 11, pp 4178–4723 (1974).

In accordance with the present invention it has been found that a particularly useful and desirable class of colored compounds exhibit a strong pleochroism, high solubility in common positive nematic liquid crystal compositions, high optical order parameters, and excellent chemical stability in combination with liquid crystal materials. Further, the pleochroic compounds of the present invention provide heretofore difficult to obtain colors particularly bright yellows of improved hue and color purity. These pleochroic compounds exhibit sharp, light absorption peaks in the region of about 430 to 440 nanometers. The absorption spectra are relatively free of spurious toes at the base of the absorption curve.

The pleochroic compounds useful in the present invention are thioanthraquinone compounds having at least one carbocyclic or heterocyclic substituent linked to the anthraquinone moiety through a sulfur atom. More specifically, the pleochroic compounds can be represented by the following general structural formula:

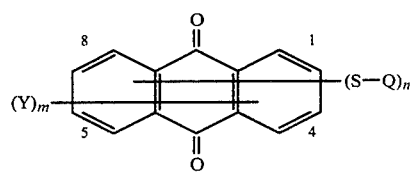

wherein
Y represents independently a radical such as —NH$_2$, —NO$_2$, or —OH;
Q represents independently

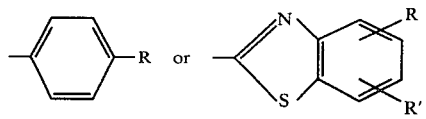

and (S-Q) is present only in one or more of positions 1, 4, 5 and 8;
R and R' independently represent hydrogen or a nonionic substituent;
m can be 0, 1 or 2;
n can be an integer from 1 to 4, and
m+n is 4 or less;
Provided, that when

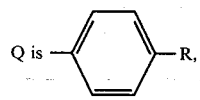

n=2, m=0, and S—Q is present only in positions 1 and 4, 1 and 5, or 1 and 8 (or the stereoisomeric positions 4 and 5 or 5 and 8). It is understood that in the formula shown above the outer-rings of the anthraquinone are unsaturated and the sites 1—8 not occupied by Y or S—Q groups contain a hydrogen atom.

The identity of the nonionic group is not critical to the pleochroic character of the compound. The nonionic group may to some extent effect the solubility of the dye in the liquid crystal composition. Typical nonionic substituent groups represented by R and R' are straight or branched chain alkyl groups having 1 to 12 carbon atoms, preferably 1 to 4 carbon atoms, alkoxy groups having 1 to 12 carbon atoms, preferably 1 to 4 carbon atoms, halogen atoms such as chlorine, fluorine or bromine, trifluoromethyl groups, difluoromethyl groups, alkylsulfonyl groups having about 1 to 12 carbon atoms, preferably 1 to 4 carbon atoms, sulfonamide groups which can be substituted at the nitrogen by lower alkyl, e.g. 1 to 4 carbon atoms, or benzyl groups, aralkoxy groups, preferably benzyloxy radicals, and aryloxy groups, preferably phenoxy groups, it being possible for the benzyloxy and phenoxy groups to be substituted further by halogen atoms, alkyl and alkoxy groups having 1 to 4 carbon atoms.

These pleochoric compounds exhibit optical order parameters with positive nematic liquid crystal compositions on the order of about 0.65 to 0.76 and thus can provide high contrast ratios, for example on the order of 10 to 1 or better. This feature is highly desirable in providing liquid crystal displays.

The substituted anthraquinone pleochoric compounds useful in the present invention can be prepared according to techniques well known in the art. For example, using techniques described in U.S. Pat. No. 4,096,111 where several of the instant pleochoric compounds are described and shown to be useful as dyes for coloring polyester.

Generally, the procedure involves the base-catalyzed condensation of anthraquinone with carbocyclic or heterocyclic mercaptans.

By way of example, the yellow pleochroic anthraquinone 1,5-bis(phenylthio)anthraquinone is prepared by reacting two equivalents of mercaptobenzene with one equivalent of 1,5-dichloroanthraquinone with potassium carbonate in dimethylformamide under reflux conditions. The reaction product is crystallized and separated by filtration and chromatography. A series of the dyes can be prepared by substituting various p-substituted mercapto benzenes in the procedure described above.

The substituted anthraquinones described herein are found to form particularly useful guest-host combinations with the commonly used nematic liquid crystals having positive dielectric anisotropy and nematic compounds or compositions including positive anisotropic compounds in dominating amounts, i.e. providing net positive dielectric anisotropy. Positive anisotropy as used herein includes compositions having net positive dielectric anisotropy.

Pleochroic dyes of the invention can be employed alone, and in guest-host combinations, with each other and with other dyes in a wide range of effective amounts with the nematic liquid crystal compositions. Generally, the upper limit of the effective amount is a function of the solubility of the pleochroic dye in the liquid cyrstal. The pleochroic dyes of the present invention can be effectively used in concentrations of up to about 25% by weight of the total guest-host combination. For liquid crystal displays providing informational content it is generally desired to maintain the background color, i.e., the color in the "clear" state, at a minimum. Accordingly, for these displays the pleochroic dyes are generally used in amounts ranging from about 0.5 to 5% by weight, preferably about 0.5 to 1.5% by weight.

Typical liquid crystal compounds exhibiting positive anisotropy and useful with the pleochroic dyes of the present invention are trans-4-n-pentyl-(4'-cyanophenyl)cyclohexane, trans-4-n-pentyl-(4'-cyanobiphenylyl)cyclohexane, p-n-hexylbenzylidene-p'aminobenzonitrile, p-methoxybenzylidene-p'-aminobenzonitrile, p-ethoxybenzylidene-p'-aminobenzonitrile, p-cyanobenzylidene-p'-n-butyoxyaniline, p-cyanobenzylidene-p'-octyloxyaniline, and compounds having the formula

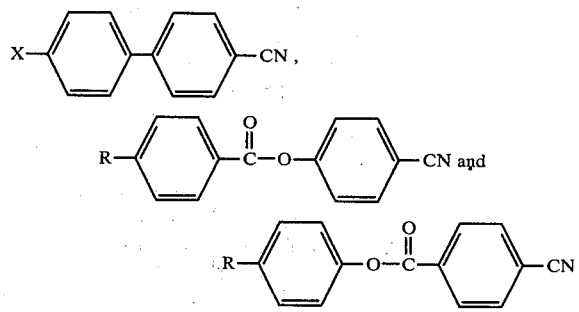

wherein R=alkyl or alkoxy having 1–7 carbon atoms and X is alkyl or alkoxy having 1–9 carbon atoms.

Eutectic mixtures and combinations of all the above are also useful. Illustrative are eutectic mixtures of 4'-substituted 4-cyanobiphenyls wherein the 4' substituents are alkyl or alkoxy of 3 to 8 carbon atoms. Representative is the commercially available mixture "E-7" from B.D.H. Ltd. Yet another useful mixture of compounds comprises mixtures of the phenycyclohexanes referred to above such as mixtures comprising the 4-alkyl-(4'cyanophenyl)cyclohexanes, and mixtures comprising both types of compounds. One useful commercial mixture is a four-component mixture available from EM Laboratories, Inc., identified as Nematic Phase 1132 TNC "Licristal." This mixture comprises, by weight, approximately: 14% trans-4-n-pentyl-(4'-cyanobiphenylyl)cyclohexane, 26% trans-4-n-propyl-(4'cyanophenyl)cyclohexane, 36% trans-4-n-pentyl-(4'-cyanophenyl)cyclohexane and 24% trans-4-n-heptyl-(4'-cyanophenyl)cyclohexane.

Useful groups of nematic liquid crystal compounds and compositions with negative anisotropy are represented by the following groups of compounds: p-methoxybenzylidene-p'-n-butylaniline, p-methoxybenzylidene-p'-aminophenylbenzoate, p-methoxybenzylidene-p'-aminophenylacetate, p-azoxyanisole, p-n-butylbenzoic acid p'-n-hexyloxyphenyl ester, p(p'-ethoxyphenylazo)phenyl heptanoate, p(p'-ethoxyphenylazo)phenyl undecylenate, p-butyoxybenzylidene-p'-pentylaniline, and p-ethoxybenzylidene-p'-n-butylaniline, as well as groups of compounds such as

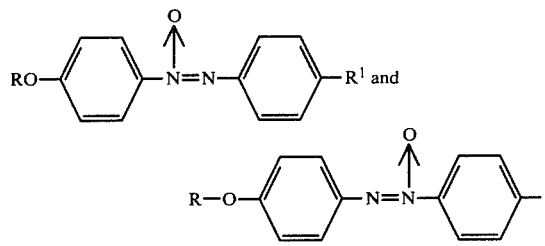

wherein R and R¹ are lower alkyl of $C_1$–$C_4$;

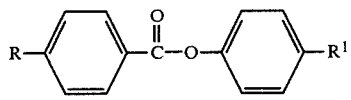

wherein R is alkyl of $C_1$–$C_7$ and R¹ is alkoxy of $C_1$–$C_7$ or wherein R is alkoxy of $C_1$–$C_7$ and R¹ is alkyl $C_1$–$C_7$;

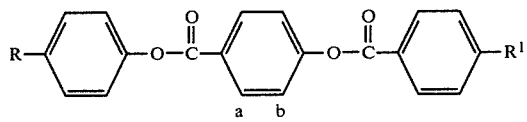

wherein R and R¹ are alkyl of $C_1$–$C_7$ and a or b are H or one can be Cl.

Certain of the negative nematic liquid crystalling compounds shown above are described in U.S. Pat. Nos. Re. 29,349, 3,829,491, 3,809,656, 3,994,567 and 3,703,331. When the negative nematic compounds are combined with the positive nematic compounds, combinations can be provided which have a net positive anisotropy. This may be achieved using only relatively low percentages of materials with high positive anisotrophy when the other materials have relatively low negative anisotrophy.

As noted hereinabove, the pleochroic anthraquinone dyes can be incorporated in a guest-host relation in combination with liquid crystal compounds or compositions, preferably those having net positive dielectric anisotropy. This is accomplished by mixing the pleochroic dye and liquid crystal and filling a conventional display cell with the mixture using techniques known in the art. For example twist nematic field effect displays can be made such as are described in U.S. Pat. No. 3,918,796 issued Nov. 11, 1975. Additionally other displays employing positive liquid crystal compounds can utilize the pleochroic compounds of the present invention, such as the devices described in U.S. Pat. Nos. 3,703,329, 3,833,287, 3,960,751 and 4,032,219. Of particular interest are the display devices employing the well-known cholesteric-nematic phase change device wherein the guest-host mixture includes a proportion for example, up to about 50% by weight, of a chiral or optically active cholesteric liquid crystal, such as cholesteryl nonanoate, resulting in absorption of all planes of light by the guest pleochroic dye eliminating any need for an external polarizing element.

The unusual properties of the instant pleochroic dyestuffs render them of value in combinations with nematic liquid crystals in display devices as for calculators, watches, etc. and also for use as electronic shutters for devices such as cameras and projectors and by use in a specular arrangement they assist in providing mirrors which can pass from specular to transparent and can be employed in cameras or wherever mirrors are used.

The substituted anthraquinone compounds of the present invention are remarkable in providing exceptionally high values of the optical order parameter S. This parameter is a measure of the efficiency of orientation of a dye. It is determined by measuring absorption of polarized light as the log of the reciprocal of percent transmission at the wavelength and incident angle of maximum absorption through a liquid crystal solution of the dye in a liquid crystal cell as described above with and without an impressed orienting electrical field. Where $A_1$ and $A_0$ are the absorption with and without field respectively, $$S = \frac{A_0 - A_1}{A_0 + 2A_1}$$

The parameter S is given as a decimal number less than 1. For a given dye it may vary somewhat depending on the particular nematic liquid crystal employed as host. Many of the pleochroic dyes described in the prior are provide values of S of the order of about 0.3 to 0.5. The pleochroic dyes of the present invention provide optical order parameters of 0.65 and higher and with preferred compounds, order parameters of 0.75 and higher can be achieved. This is a very high range of values not to be expected from compounds having the structure of the pleochoric dyes described herein.

Guest host combinations according to the present invention also provide very high contrast ratios as a result of the high order parameters of the pleochroic dyes described herein. Contrast ratios of 10 to 1 and even higher can readily be achieved using the guest-host combinations of the present invention.

As used herein the contrast ratio for a transmissive display is the difference in optical density between the on and off state of the display measured at 25° C. employing the visible portion of the spectrum where maximum absorption occurs. For a reflective display, the contrast ratio is generally measured using a collimated light source at an angle 20° incident and viewed at a normal viewing angle.

The following examples are illustrative of various aspects of the present invention.

EXAMPLE 1

The yellow pleochroic 1,5-bis(phenylthio)anthraquinone was prepared as follows: Two equivalents (2.2 g) mercaptobenzene were added to 30 g NN'Dimethylformamide, 5 g potassium carbonate, one equivalent (2.7 g) 1,5-dichloroanthraquinone and heated to reflux for 4 hours, after which 100 ml methanol were added after cooling to 80° C. Upon collecting the crystalline product by filtration, chromatography on alumina using toluene-methanol, and drying, the bright yellow orange crystalline product was obtained.

Using the procedure above, the following series of p-substituted mercaptobenzenes were used and the respective 1,5 substituted dye homologs produced.
p-ethyl mercaptobenzene
p-octyl mercaptobenzene
p-decyl mercaptobenzene
p-propyloxy mercaptobenzene
p-hexyloxy mercaptobenzene
p-nonyloxy mercaptobenzene
p-phenyl mercaptobenzene The optical order parameters of the dyes was determined by dissolving the respective pleochroic dyes at a level of 0.5% by weight in a positive nematic liquid crystal composition comprising a mixture of three cyanophenylcyclohexanes and one cyanobiphenylylcyclohexane (available commercially under the trade designation Nematic Phase 1132 TNC Licristal from E. M. Laboratories, Inc.) to which 1% by weight of cholesteryl nonanoate was added. The values to calculate the optical order parameter, S, were determined in a spectrophotometer as described previously herein.

The following table shows the properties of the 1,5 substituted dyes having the general formula shown hereinabove where m=0, N=2 and

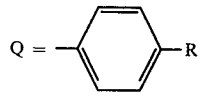

and wherein R is as shown in the table.

| R | Peak Absorption, nanometers | S |
| --- | --- | --- |
| —C$_2$H$_5$ | 440 | 0.7 |
| —C$_8$H$_{17}$ | 430 | 0.76 |
| —C$_{10}$H$_{21}$ | 430 | 0.72 |
| —OC$_3$H$_7$ | 440 | 0.65 |
| —OC$_6$H$_{13}$ | 440 | 0.7 |
| —OC$_9$H$_{19}$ | 430 | 0.75 |
| —H | 440 | 0.7 |

EXAMPLE 2

The yellow pleochroic dye 1,5-bis(thiobenzothiazinyl)anthraquinone was prepared as follows: 60 g NN'-dimethylformamide, 15 g 1,5-dichloroanthraquinone, 22 g 2-mercaptobenzothiazole, and 9 g anhydrous potassium carbonate were combined and heated to reflux for 3 hours. Upon cooling to room temperature, a quantitative yield of dye as a yellow microcrystalline powder was recovered. Continued washing with Methanol and recrystalization from hot dimethylformamide provided the pure dye.

Following the procedure above, many homologs of this dye may be made. The chart below suggests the starting materials that could be employed. Wherein the numbers in the column headings 1, 4, 5 and 8 designate the position in the anthraquinone structure.

| 1 | 4 | 5 | 8 |
| --- | --- | --- | --- |
| Cl | NH$_2$ | NH$_2$ | Cl |
| Cl | OH | OH | Cl |
| Cl | NO$_2$ | NO$_2$ | Cl |
| Cl | OH | Cl | OH |
| Cl | NH$_2$ | Cl | NH$_2$ |
| Cl | NO$_2$ | Cl | NO$_2$ |
| Cl | Cl | OH | OH |
| Cl | H | H | Cl |

Further homologs may be made following the procedure described above by using substituted 2-mercaptobenzothiazoles. Thus, substituted anthraquinone compounds according to the general formula described hereinbefore can be provided wherein Q is

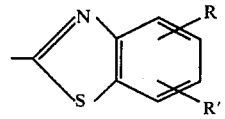

and wherein
R=—OC$_2$H$_5$, —C$_6$H$_{13}$, —C$_8$H$_{17}$, —C$_6$H$_4$, —C$_7$H$_{15}$O, and
R'=—H Using the procedure previously described to determine the optical order parameter, measurements were taken on several compounds. The results are tabulated below for substituted anthraquinone compounds having the general formula described hereinbefore wherein Q is

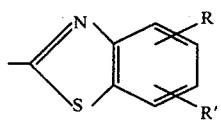

R' is hydrogen and m, n, R and Y are as shown (the Y substituent(s) are at the 4 or 4,5 positions).

| Q position | | | | | |
| --- | --- | --- | --- | --- | --- |
| 1,5 | M = 0 | n = 2 | R = H | — | S = 0.72 |
| 1,8 | M = 0 | n = 2 | R = H | — | S = 0.70 |
| 1,8 | M = 2 | n = 2 | R = H | Y = OH | S = 0.68 |
| 1,5 | M = 0 | n = 2 | R = OC$_2$H$_5$ | — | S = 0.75 |
| 1,5 | M = 1 | n = 2 | R = C$_8$H$_{17}$ | Y = NO$_2$ | S = 0.75 |
| 1,8 | M = 0 | n = 2 | R = C$_6$H$_4$ | — | S = 0.72 |

What is claimed is:
1. A composition having positive dielectric anisotropy comprising at least one nematic liquid crystal material having positive dielectric anisotropy and a pleochroic dye compound in an amount effective to provide a pleochroic character having the general formula:

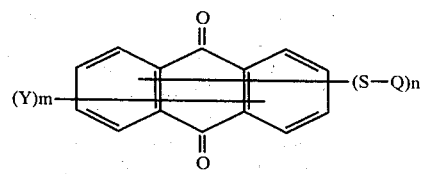

wherein
Y is independently, —NH$_2$, —NO$_2$ or —OH;
Q is independently,

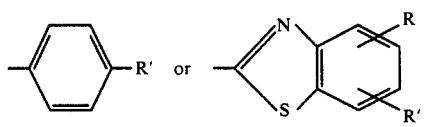

and (S—Q) is present only in one or more of positions 1, 4, 5 and 8;
R and R' independently represent hydrogen or a nonionic substituent;
m is 0, 1 or 2;
n is an integer from 1 to 4; and
m+n is 4 or less;
provided, that when

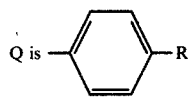

then n=2, m=0, and S—Q is present only in positions 1 and 4, 1 and 5, 1 and 8, 4 and 5 or 5 and 8.

2. A composition according to claim 1 wherein the pleochroic dye compound is selected from the group consisting of 1,5-bis(phenylthio)-anthraquinone, 1,5-bis(thioethoxybenzothiazinyl)anthraquinone, their stereoisomers, and mixtures thereof.

3. A composition according to claim 1 wherein the nematic liquid crystal composition comprises 4-alkyl-(4'-cyanophenyl)cyclohexane and 4-alkyl-(4'cyanobiphenylyl)cyclohexane.

4. A composition according to claim 1 wherein the nematic liquid crystal comprises a eutectic mixture of 4'-substituted 4-cyanobiphenyls wherein the 4' substituents are selected from the group consisting of alkyl and alkoxy having 3 to 8 carbon atoms.

5. A composition according to claim 1 wherein said pleochroic dye is present in amounts of about 0.5% to 5.0% by weight of the total composition.

6. A composition according to claim 1 additionally containing up to about 50% by weight of a chiral agent.

7. A composition according to claim 6 wherein said chiral agent is cholesteryl nonanoate.

8. An electro-optic device comprising a transparent envelope having electrodes on a portion of the opposed surfaces thereof and containing in said envelope a nematic liquid crystal composition having pleochroic dye dissolved therein in an amount effective to provide a pleochroic character, wherein the improvement comprises a liquid crystal composition comprising at least one nematic liquid crystal material having positive dielectric anisotropy and a pleochroic dye compound having the general formula:

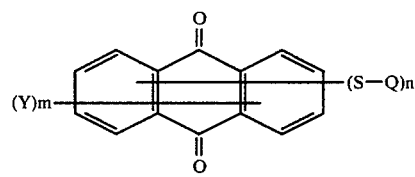

wherein
Y is, independently, —NH$_2$, —NO$_2$ or —OH;
Q is, independently,

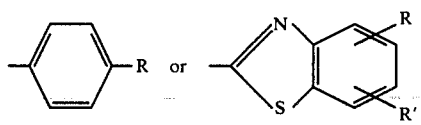

and (S—Q) is present only in one or more of positions 1, 4, 5 and 8;
R and R' independently represent hydrogen or a nonionic substituent;
m is 0, 1 or 2;
n is an integer from 1 to 4; and
m+n is 4 or less;
provided, that when

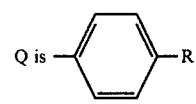

then n=2, m=0, and —S—Q is present only in positions 1 and 4, 1 and 5, 1 and 8, 4 and 5 or 5 and 8.

9. An electroptical device according to claim 8 wherein the pleochroic dye compound is selected from the group consisting of 1,5-bis(phenylthio)-anthraquinone, 1,5-bis(thioethoxybenzothiazinyl)anthraquinone, their stereoisomers, and mixtures thereof.

10. A device according to claim 8 wherein the nematic liquid crystal composition comprises 4-alkyl-(4'-cyanophenyl)cyclohexane and 4-alkyl-(4'-cyanobiphenylyl)cyclohexane.

11. A device according to claim 8 wherein the nematic liquid crystal comprises a eutictic mixture of 4'-substituted 4-cyanobiphenyls wherein the 4' substituents are selected from the group consisting of alkyl and alkoxy having 3 to 8 carbon atoms.

12. A device according to claim 8 wherein said pleochroic dye is present in amounts of about 0.5% to 5.0% by weight of the total composition.

13. A device according to claim 8 wherein said liquid crystal composition additionally contains up to about 50% by weight of a chiral agent.

14. A device according to claim 13 wherein said chiral agent is cholesteryl nonanoate.

* * * * *